Patented Oct. 11, 1938

2,132,394

UNITED STATES PATENT OFFICE 2,132,394

SHORTENING AND METHOD OF MAKING SAME

Herbert S. Coith, Albert S. Richardson, and Verling M. Votaw, Wyoming, Ohio, assignors to The Procter & Gamble Company, Cincinnati, Ohio, a corporation of Ohio No Drawing. Application February 4, 1933, Serial No. 655,293

26 Claims. (Cl. 99—123)

Our invention relates to the class of shortenings which are made plastic by the controlled blending of fatty oils or soft fats with relatively small proportions of hard fat, and relates more particularly to new plastic shortenings containing synthetic hard fat of the monoglyceride type.

The object of our invention is to provide a blended plastic shortening containing hard fat which, with respect to the quality of the baked products made with use of the shortening, is superior to the hard fats heretofore used or proposed for use in blended plastic shortenings.

Our invention will be best explained by referring first to a distinctive class of plastic shortenings, frequently known as compound and sold under numerous brand names, which consist essentially of unhydrogenated vegetable oil together with a smaller amount of hard fat. Usually the hard fat is either oleostearin or almost completely hydrogenated fat. For instance, a common formula for compound shortening is 85–88% cottonseed oil and 15–12% hydrogenated cottonseed oil of about 18 iodine value or lower.

All the hard fats heretofore commonly incorporated in compound shortenings are of the triglyceride type. It has also been proposed to plasticize fatty oils by incorporating therewith synthetic hard fat, diglycerides derived from palmitic and stearic acids being specifically recommended for the purpose. Although hard fat of the diglyceride type can be readily shown to serve the purpose intended, namely that of imparting a desirable plastic consistency to the blended shortening, such plastic shortening has never come into commercial use as far as we have been able to ascertain.

The question of the relative merits of the different hard fats blended with fatty oils or soft fats does not appear to have been previously investigated from the point of view of possible differences in the action of the shortening in baked products. We have investigated this problem and have discovered marked differences in the value of different hard fats, and have discovered that both the triglyceride hard fats commonly used and the diglyceride hard fats proposed for use are distinctly inferior to the hard fats employed in our new plastic shortening.

According to the present invention, compound shortening of increased value for use in baked products is made from fatty oil plasticized in whole or in substantial part by hard fat of the monoglyceride type.

The simplest (but not preferred) manner of applying our invention is to make a shortening of the compound type, consisting of a plastic blend of about four to seven parts of an edible fatty oil with one part of hard fat of the monoglyceride type.

The choice of fatty oil for use in our compound shortening is based on the same considerations which govern the choice of fatty oil for use in compound shortenings generally. Cottonseed oil is particularly suitable on account of its commercial availability in large quantity, but other predominantly unsaturated oils, such as peanut, sesame, corn, or soybean, may also be used. Oils of the coconut type may be used if blended with about an equal amount or more of predominantly unsaturated oil of lower congealing point than coconut oil to ensure proper plasticity. All these edible oils are essentially triglycerides. The necessary processing steps to make them of edible grade are well-known, alkali refining and vacuum steam deodorizing being of the most general importance.

For the complete characterization of the special hard fat required in shortening made in accordance with the present invention, it is necessary to consider both the nature of the fatty acids, the amount of glycerin combined therewith, and the nature of the combination.

The fatty acids from which our special hard fat is derived are predominantly saturated and are predominantly of molecular formula containing sixteen or more carbon atoms. For example, ordinary oleostearin is a suitable fatty source for the preparation of our special hard fat. We may also use as a fatty source a hydrogenated hard fat, obtained by hydrogenating to about 40 or lower iodine value a vegetable oil such as cottonseed, peanut, or sesame oil, or an animal fat such as lard or tallow, or a marine oil such as a carefully selected pilchard or whale oil. On account of the greater stability of the triglyceride, it is preferable to hydrogenate and also deodorize the fat prior to formation of monoglyceride.

Thus a specific example of shortening made by practicing our invention in its simplest form is a plastic blend of 88% cottonseed oil with 12% monoglyceride of hydrogenated cottonseed oil of about 10 iodine value. We have found that a plastic fat of this formula is superior for use as shortening to corresponding plastic blends made with use of the hydrogenated hard fat in the form of either triglyceride or diglyceride. The improved value of our compound manifests itself in the firm but light and tender texture of many baked products, and particularly manifests itself in the larger proportion of sugar and moisture which may be incorporated in cakes made with our shortening. Increasing proportions of sugar and water in general tend to destroy the light, tender texture and correspondingly to decrease the volume of cakes, but this tendency is in considerable measure counteracted by the substitution of our improved shortening for the usual compound shortening.

Our invention is not limited to shortening containing hard fat exclusively of the monoglyceride type. Preferably about half or more of the hard fat incorporated with fatty oils to make compound shortening in accordance with our invention consists of triglyceride. While this triglyceride portion of the hard fat may be synthetic, ordinary triglyceride hard fats are satisfactory and usually more economical, and hence the special synthetic hard fat mentioned throughout the present specification refers primarily to that portion of our hard fat which consists in whole or substantial part of monoglyceride.

The essential characteristics of this special synthetic hard fat, which we have found to be best for incorporation in shortening along with ordinary fatty oils or soft fats, can be more conveniently described in terms of the proportion of combined glycerin than in terms of its absolute composition. For instance, the triglyceride, diglyceride and monoglyceride of stearic acid contain approximately 10.3, 14.8, and 25.7% combined glycerin, respectively. In practical manufacture, it is difficult and expensive to prepare pure distearin or monostearin. However, practical procedures are known in the prior art for combining glycerin with mixed fatty acids to form mixtures of the various glycerides, and for combining glycerin with triglycerides to form mixtures containing both monoglycerides and diglycerides; and within wide limits control of the proportion of combined glycerin in our synthetic hard fat presents no particular difficulty.

As the proportion of combined glycerin in the hard fat increases up to the percentage of glycerin required for diglyceride formation, the synthetic fat is only slightly improved from the standpoint of the value of the shortening made therewith. Above the proportion of combined glycerin required for diglyceride formation, the value of the shortening increases markedly, and to obtain in substantial degree the advantages of the shortening disclosed and claimed in the present invention it is desirable that the special synthetic hard fat incorporated in the shortening contain a minimum of approximately 19% combined glycerin. Alternatively we may characterize the special synthetic hard fat required in our plastic shortening as containing more combined glycerin in the form of monoglyceride than in the form of diglyceride, the minimum proportion of combined glycerin in such a fat mixture being roughly 19%, when the hard fat is derived from fatty acids of the preferred type already set forth.

Preferably our special synthetic hard fat contains about 22% or more combined glycerin and consists largely of monoglyceride; the proportion of such hard fat incorporated in our shortening is preferably between 25% and 50% of the total hard fat and between 4% and 6% of the total weight of shortening, and the remainder of the hard fat required to bring the consistency of the shortening to the desired plastic state is preferably of the usual triglyceride type. It should be understood that these suggested preferred ranges are based in part on the desire to hold the amount of the more expensive synthetic fat to a minimum, and our invention is not limited to these particular ranges. Valuable results can be obtained with quantities of the monoglyceride hard fat less than 4% of the total shortening, for example, 2%. Likewise more than 6% of the special synthetic hard fat may be used, the upper limit being determined primarily by the desired consistency of the shortening.

In composition and in a number of physical and chemical properties, an equimolecular mixture of monoglyceride and triglyceride fats resembles the diglyceride derived from the same fatty acids. We have found that this is not true in the case of a hard fat incorporated in compound shortening, when the hard fat is judged by the effect of the shortening containing same on the texture and volume of sweet baked goods. In this respect, we have found that the mixture of monoglyceride and triglyceride is surprisingly superior to the diglyceride hard fat, although any of the three forms of hard fat or any combination thereof is an efficient plasticizer of fatty oils.

While our invention is of value chiefly for making plastic shortenings which include in their composition a large proportion of fat which is liquid at ordinary temperature, it may also be advantageously applied to other plastic shortenings not conforming distinctively to the compound type. Thus we start with any edible mixture of triglycerides which is softer than desired for plastic shortening and improve same by incorporating therein hard fat containing 19% or more glycerin and otherwise characterized as already set forth herein. Preferably we use between 2% and 6% of a hard fat consisting chiefly of monoglyceride. Thus an unsaturated vegetable oil, such as cottonseed, soybean or corn oil, may be hydrogenated to a degree short of that required to give the desired plasticity, and this under-hydrogenated oil stiffened by incorporating therein about 2% to 6% of a synthetic fat consisting predominantly of the monoglyceride of the fatty acids derived from any one of the same or similar oils after almost complete hydrogenation. Likewise a blend of liquid fat and of plastic fat, for example, a blend of cottonseed oil and tallow, may be stiffened by the addition of synthetic hard fat consisting chiefly of monoglyceride. Examples 5 and 6 set forth hereinafter illustrate the application of our invention to shortenings not belonging distinctively to the compound type.

We have also found that the shortening is further improved for baking if, in addition to monoglyceride, a small quantity of free fatty acid or of soap is used, the amount of which is preferably not less than about 0.13% of the total shortening. This is higher than the percentage of free fatty acid found in many shortenings heretofore generally classed as being of best quality for baking purposes. We are able to obtain such excellent results in baked products with the use of 0.25% or less of soap or free fatty acid in our shortening that ordinarily we prefer not to use a larger amount. However, it should be understood that the effectiveness of soap and free fatty acid is greater with higher percentages and, to obtain the maximum volume of the finished baked products, it may be desirable to use 4% or even more of free fatty acid in our shortening. Combinations of free fatty acid and soap are also effective. Any added free fatty acid or soap, of course, should be carefully prepared from fat of strictly edible grade, even though very minute amounts are sufficient to produce substantial results. Free fatty acids having more than 12 carbon atoms per molecule are preferred on account of flavor; they may be derived, for example, from cottonseed, peanut, or like vegetable oil, or from lard or tallow.

The following are examples of shortening made in accordance with our invention:

Example 1

| | Per cent |
|---|---|
| Cottonseed oil | 85 |
| Hydrogenated cottonseed oil of 15 iodine value | 9 |
| Monoglyceride of hydrogenated cottonseed oil of 15 iodine value | 6 |

Example 2

| | Per cent |
|---|---|
| Cottonseed oil | 42.5 |
| Sesame oil | 42.5 |
| Hydrogenated cottonseed oil of 15 iodine value | 9.0 |
| Monoglyceride of hydrogenated cottonseed oil of 15 iodine value | 6.0 |

Example 3

| | Per cent |
|---|---|
| Peanut oil | 20.0 |
| Cottonseed oil | 64.8 |
| Hydrogenated cottonseed oil of 15 iodine value | 9.0 |
| Monoglyceride of hydrogenated peanut oil of 20 iodine value | 6.0 |
| Free fatty acid of cottonseed oil | 0.2 |

Example 4

| | Per cent |
|---|---|
| Cottonseed oil | 87.8 |
| Hydrogenated cottonseed oil of 15 iodine value | 6.0 |
| Monoglyceride of hydrogenated cottonseed oil of 15 iodine value | 6.0 |
| Soap | 0.2 |

Example 5

| | Per cent |
|---|---|
| Hydrogenated whale oil of 78 iodine value | 90 |
| Synthetic fat containing 20% combined glycerin, prepared from the fatty acids of oleostearin | 4 |
| Hydrogenated cottonseed oil of 10 iodine value | 6 |

Example 6

| | Per cent |
|---|---|
| Cottonseed oil | 44 |
| Edible tallow | 50 |
| Monoglyceride of hydrogenated tallow of 10 iodine value | 6 |

Example 7

| | Per cent |
|---|---|
| Cottonseed oil | 83 |
| Hydrogenated cottonseed oil of 12 iodine value | 13 |
| Monoglyceride of hydrogenated cottonseed oil of 12 iodine value | 2 |
| Free fatty acid of cottonseed oil | 2 |

Example 8

| | Per cent |
|---|---|
| Sesame oil | 50 |
| Peanut oil | 25 |
| Coconut oil | 10 |
| Monoglyceride of completely hydrogenated peanut oil | 15 |

Example 9

| | Per cent |
|---|---|
| Cottonseed oil | 87.9 |
| Hydrogenated cottonseed oil of 15 iodine value | 6.0 |
| Monoglyceride of hydrogenated cottonseed oil of 15 iodine value | 6.0 |
| Free fatty acid of cottonseed oil | .05 |
| Sodium soap of the fatty acids of hydrogenated cottonseed oil of 15 iodine value | .05 |

While the shortenings described in Examples 1, 2, 4, 5, 6 and 8 contain no free fatty acid added as such, the main body of shortening, and possibly also the superglycerinated fat, will ordinarily contain an appreciable quantity of free fatty acid. Thus in a particular instance we have prepared the compound described in Example 1 containing .17% free fatty acid.

As already explained, the improved value of our compound manifests itself in the firm, tender texture and in the volume of many baked products. As an illustration, the compound described in Example 1 was compared with two other shortening compositions, in which the 6% of monoglyceride of the example was replaced respectively by a synthetic diglyceride and by triglyceride of the same hydrogenated cottonseed oil, the following baking recipe being used for the test:

| | Lbs. | Ozs. |
|---|---|---|
| Sugar | 1 | 7 |
| Fat | 0 | 7 |
| Salt | 0 | ½ |
| Egg whites | 0 | 10 |
| Milk | 1 | 0 |
| Flour | 1 | 0 |
| Baking powder | 0 | ¾ |

The cake containing the monoglyceride was of much lighter and more pleasing texture than the other cakes, the volumes being as follows:

Hard fat used—Cake volume, 12 ounces

| | cc. |
|---|---|
| 6% Monoglyceride plus 9% triglyceride | 880 |
| 6% Diglyceride plus 9% triglyceride | 800 |
| 15% Triglyceride | 785 |

In the foregoing examples, the term "monoglyceride" does not necessarily refer to a material exclusively monoglyceride, but to a synthetic fat consisting predominantly of monoglyceride. Likewise the diglyceride used in the experiment described immediately above was not exclusively diglyceride, but a synthetic fat containing predominantly diglyceride together with some triglyceride and monoglyceride, the synthetic mixture as a whole containing approximately the same percentage of combined glycerin as would be contained in diglyceride.

Baked products of the type just described are not claimed in the present invention, but are further described and claimed in our copending application Serial No. 655,295, fitted concurrently herewith.

Having thus described the invention, what is claimed as new and desired to be secured by Letter Patents is:

1. A plastic shortening consisting essentially of at least 2% of hard fat of the monoglyceride type and softer fat of the triglyceride type, the amount of said hard fat being sufficient to stiffen the mixture substantially and, as compared with the same proportion of triglyceride and diglyceride hard fats, to effect substantial increase in the volume of cakes prepared with the shortening and containing more sugar than flour.

2. A plastic shortening in which the fatty material consists essentially of at least 2% of a synthetic hard fat containing not lesss than 19% combined glycerin together with softer fat consisting of triglyceride, the amount of said hard fat being sufficient to stiffen the mixture substantially and, as compared with the same proportion of triglyceride and diglyceride hard fats, to effect substantial increase in the volume of cakes prepared with the shortening and containing more sugar than flour.

3. A blended plastic fat consisting essentially of a major proportion of relatively soft fat consisting of triglyceride and at least 2% hard fat belonging to the class consisting of monoglyceride and diglyceride, said hard fat containing more combined glycerin in the form of monoglyceride than in the form of diglyceride, the amount of said hard fat being sufficient to stiffen the mixture substantially.

4. A blended plastic shortening in which the fatty material consists essentially of a major proportion of relatively soft fat consisting of ordinary triglycerides and not less than 2% hard fat containing not less than 19% glycerin in combination with fatty acids which are predominantly saturated and are principally of molecular formula having sixteen or more carbon atoms, the amount of said hard fat being sufficient to stiffen the mixture substantially and, as compared with the same proportion of triglyceride and diglyceride hard fats, to effect substantial increase in the volume of cakes prepared with the shortening and containing more sugar than flour.

5. A blended plastic shortening in dry form consisting of triglyceride fatty oil and at least 2% of hard fat containing not less than 19% combined glycerin and consisting essentially of monoglycerides and diglycerides of predominantly saturated fatty acids of molecular formula having principally sixteen or more carbon atoms, the amount of said hard fat being sufficient to stiffen the mixture substantially.

6. A plastic shortening consisting of triglyceride fatty oil, hard fat of the triglyceride type, and at least 2% of a synthetic hard fat derived from predominantly saturated fatty acids and consisting predominantly of monoglyceride, the amount of said hard fat being sufficient to stiffen the mixture substantially.

7. A plastic shortening comprising relatively soft fat of the triglyceride type, added free fatty acid, and a synthetic hard fat selected from the group consisting of monoglycerides and diglycerides of predominantly saturated fatty acids, the major part of the combined glycerin of said hard fat being present in the form of monoglyceride, the amount of said hard fat being sufficient to stiffen the mixture substantially.

8. A substantially dry plastic shortening agent comprising relatively soft fat of the triglyceride type, a small quantity of soap, and a synthetic hard fat selected from the group consisting of monoglycerides and diglycerides of predominantly saturated fatty acids, the major part of the combined glycerine of said hard fat being present in the form of monoglyceride, the amount of said hard fat being sufficient to stiffen the mixture substantially.

9. A plastic shortening consisting of a blend of fatty glycerides of edible grade characterized by a content of at least two per cent of a hard fat derived from predominantly saturated fatty acids and consisting predominantly of monoglyceride, the amount of said hard fat being sufficient to stiffen the mixture substantially.

10. A plastic shortening consisting essentially of a fatty oil hardened by hydrogenation to a consistency softer than required in the finished shortening and at least 2% of a relatively hard synthetic fat containing not less than 19% glycerin esterified with predominantly saturated fatty acids of molecular formula having principally sixteen or more carbon atoms, the amount of said hard fat being sufficient to stiffen the mixture substantially.

11. An edible plastic fat consisting essentially of fatty oil selected from the group including peanut, cottonseed, sesame, corn and soybean oil, a hard fat of the triglyceride type, and at least 2% of a hard synthetic fat containing not less than 19% glycerin in combination with predominantly saturated fatty acids, the quantity of each hard fat being sufficient to contribute a substantial stiffening effect upon the mixture as a whole.

12. A plastic shortening comprising approximately 85% cottonseed oil, 9% almost completely hydrogenated cottonseed oil, and 6% of hard fat consisting principally of monoglyceride and derived from cottonseed oil hydrogenated to an iodine value not exceeding 40.

13. A plastic shortening consisting of triglyceride fatty oil and a least 2% of monoglyceride of a hydrogenated fat of not higher than 40 iodine value, the amount of said monoglyceride being sufficient to stiffen the mixture substantially.

14. A plastic shortening consisting of triglyceride fatty oil and at least 2% of monoglyceride of oleostearin, the amount of said monoglyceride being sufficient to stiffen the mixture substantially.

15. A plastic composition of matter consisting of 4 to 7 parts of triglyceride fatty oil having intimately incorporated therewith 1 part of hard fat consisting predominantly of monoglyceride.

16. A blended fatty mixture comprising coconut oil, a larger quantity of fatty oil less saturated and of lower melting point than coconut oil, and at least 2% synthetic hard fat containing more than 19% combined glycerin, said hard fat consisting of glycerides of fatty acids which are predominantly saturated and predominantly of molecular formula having not less than sixteen carbon atoms, the amount of said hard fat being sufficient to stiffen the mixture substantially.

17. A plastic shortening consisting of blended glycerides, including a stiffening agent comprising a synthetic fat in which monoglyceride predominates, the amount of said synthetic fat being sufficient to stiffen the mixture substantially, and to constitute at least 2% of the total weight of glycerides.

18. In the manufacture of plastic shortening consisting of blended glycerides, the step which comprises mixing with an edible oil, a stiffening agent including at least 2% of a synthetic fat in which monoglyceride predominates, the amount of said synthetic fat being sufficient to stiffen the mixture substantially.

19. A process of preparing shortening of the compound type which includes the following steps, taken in the order named:

A. Hydrogenating an edible fatty material to an iodine value not exceeding 40;

B. Subjecting the hydrogenated material to vacuum steam deodorization;

C. Combining with the hydrogenated material an amount of glycerin sufficient to produce a synthetic fat containing not less than 19% combined glycerin;

D. Mixing at least 2% of the resulting material with an edible fatty material of less stiffness to plasticize the latter.

20. A plastic shortening comprising a mixture of from 98% to 94% of edible triglyceride of fatty acid, and from 2% to 6% of a stiffer edible fatty material in which the monoglyceride of fatty acid predominates.

21. In the process of manufacturing plastic shortening, the following steps taken in the order named:

A. Subjecting a hard fat of the triglyceride type to vacuum steam deodorization;

B. Combining with the deodorized triglyceride hard fat an amount of glycerin sufficient to produce a synthetic fat containing not less than 19% combined glycerin;

C. Mixing at least 2% of the resulting material with a softer edible fat consisting essentially of triglyceride to plasticize the latter and to render it suitable for incorporation in cakes containing more sugar than flour.

22. A plastic shortening in which the fatty material is substantially free from ethyl esters of fatty acids and consists essentially of at least 2% of hard fat of the monoglyceride type and softer fat of the triglyceride type, the amount of said hard fat being sufficient to stiffen the mixture substantially and, as compared with the same proportion of triglyceride and diglyceride hard fats, to effect substantial increase in the volume of cakes prepared with the shortening and containing more sugar than flour.

23. A plastic shortening including fatty esters in which all such esters are glycerin esters, comprising a mixture of at least 2% of hard fat of the monoglyceride type and softer fat of the triglyceride type, the amount of said hard fat being sufficient to stiffen the mixture substantially and, as compared with the same proportion of triglyceride and diglyceride hard fats, to effect substantial increase in the volume of cakes prepared with the shortening and containing more sugar than flour.

24. A blended plastic shortening in dry form including fatty esters, all such esters being glycerin esters, said esters comprising triglyceride fatty oil and at least 2% of hard fat containing not less than 19% combined glycerin and consisting essentially of monoglycerides and diglycerides of predominantly saturated fatty acids of molecular formula having principally sixteen or more carbon atoms, the amount of said hard fat being sufficient to stiffen the mixture substantially.

25. A plastic shortening substantially free from ethyl esters of fatty acids and comprising a mixture of hard fat including synthetic hard fat of the monoglyceride type with softer fat of the triglyceride type, the amount of said hard fat being sufficient to stiffen the mixture substantially, and the amount of the synthetic monoglyceride fat being between about 4% and 6% of the total weight of the shortening.

26. A plastic shortening consisting essentially of soft fat of the triglyceride type and at least 2% of hard fat of the monoglyceride type, the monoglyceride functioning as a stiffening agent, and to effect a substantial increase in the volume of cakes prepared with shortening and from a batter containing more sugar than flour.

HERBERT S. COITH.
ALBERT S. RICHARDSON.
VERLING M. VOTAW.